United States Patent
Kim et al.

(10) Patent No.: US 12,062,771 B2
(45) Date of Patent: Aug. 13, 2024

(54) COATED ELECTRODE FOR ENERGY STORAGE DEVICE

(71) Applicant: SK ON CO., LTD., Seoul (KR)

(72) Inventors: Jangwoo Kim, San Jose, CA (US); Young-Hye Na, San Jose, CA (US); Maxwell Giammona, Pleasanton, CA (US)

(73) Assignee: SK ON CO., LTD., Seoul (KR)

( * ) Notice: Subject to any disclaimer, the term of this patent is extended or adjusted under 35 U.S.C. 154(b) by 476 days.

(21) Appl. No.: 16/297,424

(22) Filed: Mar. 8, 2019

(65) Prior Publication Data
US 2020/0287199 A1     Sep. 10, 2020

(51) Int. Cl.
| | |
|---|---|
| *H01M 4/38* | (2006.01) |
| *H01M 4/02* | (2006.01) |
| *H01M 4/04* | (2006.01) |
| *H01M 4/48* | (2010.01) |
| *H01M 12/08* | (2006.01) |
| *H01M 8/18* | (2006.01) |

(52) U.S. Cl.
CPC ......... *H01M 4/0402* (2013.01); *H01M 4/382* (2013.01); *H01M 4/48* (2013.01); *H01M 12/08* (2013.01); *H01M 2004/021* (2013.01); *H01M 2004/027* (2013.01); *H01M 8/188* (2013.01)

(58) Field of Classification Search
CPC ...... H01M 4/0402; H01M 4/382; H01M 4/48; H01M 12/08; H01M 8/188; H01M 2004/021; H01M 2004/027
See application file for complete search history.

(56) References Cited

U.S. PATENT DOCUMENTS

| | | | | |
|---|---|---|---|---|
| 9,997,755 | B2 * | 6/2018 | Goetzen | H01M 10/0525 |
| 2009/0263723 | A9 | 10/2009 | Zaghig et al. | |
| 2009/0280410 | A1 * | 11/2009 | Zaguib | C23C 28/34 |
| | | | | 429/220 |
| 2016/0064770 | A1 | 3/2016 | Lee et al. | |
| 2016/0329567 | A1 | 11/2016 | Lee et al. | |
| 2020/0395586 | A1 * | 12/2020 | Kim | H01M 10/052 |
| 2021/0143511 | A1 * | 5/2021 | Zhang | H01M 4/382 |

FOREIGN PATENT DOCUMENTS

WO     2017190366 A1     11/2017

OTHER PUBLICATIONS

Choudhury et al., Hybrid Hairy Nanoparticle Electrolytes Stabilizing Lithium Metal Batteries, Chemistry of Materials 28:2147-2157 (2016).

(Continued)

*Primary Examiner* — Milton I Cano
*Assistant Examiner* — Mary G Henshaw
(74) *Attorney, Agent, or Firm* — Perkins Coie LLP (57) ABSTRACT

An energy storage device includes a coated anode. The coated anode includes a metallic anode in contact with an electrically non-conductive star polymer coating. The star polymers in the star polymer coating include a core with at least 3 arms attached to the core. At least some of the arms of the star polymers have ionically conductive polar functional groups. The energy storage device further includes a cathode and an electrolyte in contact with both the cathode and the coated anode.

10 Claims, 12 Drawing Sheets

(56) References Cited

OTHER PUBLICATIONS

Deng et al., Microporous polymer electrolyte based on PVDF/PEO star polymer blends for lithium ion batteries, Journal of Membrane Science 491:82-89 (2015).

Tong et al., Enhanced conductivity of novel star branched liquid crystalline copolymer based on poly(ethylene oxide) for solid polymer electrolytes, Applied Surface Science 258:10095-10103 (2012).

Zhou et al., Effect of amphiphilic hyperbranched-star polymer on the structure and properties of PVDF based porous polymer electrolytes, Solid State Ionics 180:1517-1524 (2009).

Wikipedia, Polymer Architecture, available at https://en.wikipedia.org/w/index.php?title=Polymer_architecture&oldid=1049182987 (downloaded on Oct. 25, 2021).

3M Brochure, A Collection of Scientific Results for Impregum(tm) Polyether Impression Material, available at https://multimedia.3m.com/mws/media/387036O/3m-impregum-polyether-impression-material-collection-of-scientific-results.pdf&fn=imp_sci_facts.pdf (downloaded on Oct. 25, 2021).

Kwon, S. et al., "Preparation of organic/inorganic hybrid semi-interpenetrating network polymer electrolytes based on poly(ethylene oxide-co-ethylene carbonate) for all-solid-state lithium batteries at elevated temperatures," Polymer 55 (2014) 2799-2808.

Kim, D. et al., "Preparation of solid-state composite electrolytes based on organic/inorganic hybrid star-shaped polymer and PEG-functionalized POSS for all-solid-state lithium battery applications," Polymer 54 (2013) 5812-5820.

Kim, D. et al., "Star-Shaped Polymers Having Side Chain POSS Groups for Solid Polymer Electrolytes; Synthesis, Thermal Behavior, Dimensional Stability, and Ionic Conductivity," Journal of Polymer Science: Polymer Chemistry 50 (2012) 3618-3627.

Kim, D. et al., "Toward Fast Operation of Lithium Batteries: Ion Activity as the Factor to Determine the Concentration Polarization," ACS Energy Lett. 4 (2019) 1265-1270.

\* cited by examiner

COATED ELECTRODE FOR ENERGY STORAGE DEVICE

BACKGROUND

Rechargeable batteries are used as a power source in a wide range of applications such as, for example, industrial devices, medical devices, electronic devices, electric vehicles, and grid energy storage systems. Battery technology is continually being developed to enable higher energy density and greater efficiency.

Metallic anodes, such as, for example, lithium, sodium, and/or magnesium may improve energy storage capability compared to conventional lithium-ion batteries that employ lithium intercalating graphitic anodes. The use of metallic anodes may also provide a relatively high specific energy in metal-sulfur batteries, metal-air batteries, metal-oxygen batteries, metal-carbon dioxide batteries, and batteries including metal with other gas mixtures including oxygen. For example, a lithium-oxygen battery could potentially have a theoretical specific energy three to five times greater than conventional lithium ion batteries.

However, despite its superior energy density, metals such as lithium, sodium and magnesium have been difficult to use as anodes in energy storage devices due at least in part to the growth of dendrites (needle-like metallic crystals) on the surfaces thereof during device operation. In some cases, dendrite growth can cause electrochemical instability and electrical shorting in the energy storage device.

SUMMARY

Protective coatings can be used on metallic anodes to suppress dendrite growth and improve electrochemical rechargeability. However, metals such as lithium, sodium and magnesium are highly reactive to the ambient environment, and it has proven difficult to find a protective coating for an anode for an energy storage device that is sufficiently thin to retain the overall cell-level energy density of the device.

In one aspect, the present disclosure is directed to an ultra-thin coating material on a surface of a metallic anode in an energy storage device such as, for example, a rechargeable metal battery. The coated metal anode can improve the electrochemical performance of the energy storage device by, for example, efficiently suppressing metal dendrite growth on the anode and enhancing cyclability.

Metallic anode materials (for example, Li, Na, Mg) used in rechargeable metal batteries are very sensitive to air and/or moisture, and protective coatings are applied on their surfaces in a highly controlled inert environment. The coatings described in the present disclosure, which include star polymers, can be applied to the surface of the highly reactive metallic anodes simply by exposing the anodes to a solution including the star polymers. This star polymer deposition process is simple and more efficient than other surface modification methods such as chemical reaction and physical surface treatment.

The amphiphilic conformal star polymers in the coating include an ionically non-conductive core and ionically conductive arms. The star polymers can, in some embodiments, self-assemble on the surfaces of the metallic anodes and form an ultrathin molecular layer thereon. The ultrathin coating includes ionically non-conductive nanodomains formed from the cores of star polymers within an ionically-conductive matrix formed from the arms of star polymers. The nano-scale pattern in the coating protects the surfaces of the anode by suppressing dendrite formation, and retains the energy density of the anode during operation of an energy storage device.

In one aspect, the present disclosure is directed to an energy storage device including a coated anode. The coated anode includes a metallic anode in contact with an electrically non-conductive star polymer coating. The star polymers in the star polymer coating include a core with at least 3 arms attached to the core, and at least some of the arms of the star polymers include ionically conductive polar functional groups. The energy storage device further includes a cathode; and an electrolyte in contact with both the cathode and the coated anode.

In another aspect, the present disclosure is directed to a method of making a coated metallic anode for an energy storage device. The method includes: applying on a surface of a metallic anode an organic solution of star polymers, wherein the star polymers include an ionically insulating core and at least three arms, and wherein at least some of the arms on the star polymers have ionically conducting polar functional groups; and draining excess of the organic solution of the star polymers to form the coated metallic anode.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3B demonstrates that star polymers with a size of approximately 20 nm each in diameter attract one another, self-assemble and attach on the metal surface to form an ultrathin monolayer.

Like symbols in the drawings indicate like elements.

DETAILED DESCRIPTION

Figure 1:
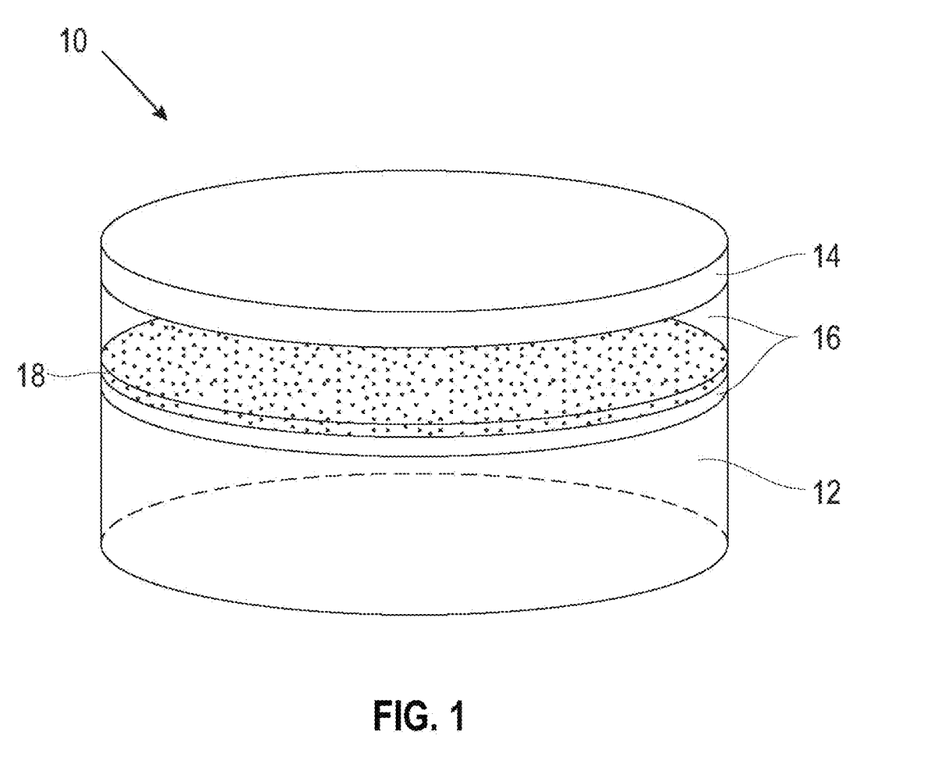
FIG. 1 is a conceptual diagram illustrating an example battery including a metallic anode, an electrolyte, a cathode, and an optional porous separator.

FIG. 1 is a conceptual diagram illustrating a battery 10 including an anode 12, an electrolyte 16, and a cathode 14. In some embodiments, the battery 10 includes an optional porous separator 18 between the anode 12 and the cathode 14. In some embodiments, the battery 10 operates via reduction-oxidation (redox) reactions, and utilizes different oxidation states and redox reactions of one or more components or elements for charge and discharge cycles.

The anode 12 is a metallic material including, but not limited to, lithium, sodium, or magnesium. In some embodiments, the anode 12 includes elemental lithium, sodium, or magnesium, or alternatively lithium, sodium, or magnesium alloyed with one or more additional elements. In some embodiments, the anode 12 consists essentially of elemental Li, Na, Mg and includes only minor amounts of impurities. In examples in which battery 10 operates via redox reactions, the metal of anode 12 (e.g., Li, Na, Mg) may be oxidized at anode 12 and reduced at the cathode 14 to induce the flow of electrons.

In some examples, the cathode 14 may include a material of suitable electrical conductivity that collects electrons generated by a redox reaction during discharge of battery 10 and provides a conductive path to an external electrical circuit to which battery 10 is connected. Similarly, during recharge of battery 10, the cathode material may provide an electrical pathway between an external voltage source and electrolyte 16 to supply voltage for another redox reaction to charge battery 10. In some cases, the cathode 14 may include a current collector material such as an electrically conductive powder like a metal and/or carbon powder, woven or non-woven metal fibers, metal foam, woven or non-woven carbon fibers, or the like. In some embodiments, the cathode 14 may include stainless-steel mesh, aluminum (Al) mesh, nickel (Ni) foam, copper (Cu), and/or carbon paper. For example, the cathode 14 may include a stainless-steel mesh with carbon nanoparticles deposited thereon.

In some embodiments, the cathode 14 may include or be in contact with a source of oxygen or another gas mixture including oxygen. For example, the battery 10 may be a metal-oxygen battery, a metal-carbon dioxide battery, or a battery including metal with other gas mixtures including oxygen, in which the cathode 14 may include or be in contact with oxygen, air, carbon dioxide, or another gas mixture including oxygen. In some examples, the source of oxygen and/or cathode 14 may also include a catalyst. For example, the source of oxygen and/or cathode 14 may include a transition metal oxide, such as manganese oxide (MnO$_2$), chromium (III) oxide (Cr$_2$O$_3$), cobalt (II, III) oxide (Co$_3$O$_4$), and/or ruthenium (IV) oxide (RuO$_2$).

In some embodiments the cathode 14 may include sulfur. For example, the cathode 14 may include a current collector material with sulfur particles deposited thereon, or alternatively sulfur-coated carbon nanotubes. As another example, the cathode 14 may include a sulfur-containing cathode material including a redox-mediator. In some examples, the redox-mediator may include birnessite ($\delta$-MnO$_2$), titanium dioxide (TiO$_2$), zirconium dioxide (ZrO$_2$), or combinations thereof.

In some embodiments, the cathode 14 may be selected from materials suitable for use in a Li-ion battery such as, for example, lithium cobalt oxide (LCO, e.g., LiCoO$_2$), nickel cobalt aluminum (NCA, e.g., LiNi$_x$Co$_y$Al$_z$O$_2$, LiNi$_{0.8}$Co$_{0.15}$Al$_{0.05}$O$_2$), lithium ion manganese oxide (LMO, e.g., LiMn$_2$O$_4$), lithium nickel manganese cobalt oxide (NMC, e.g., LiNiMnCoO$_2$), nickel cobalt manganese (NCM, e.g., LiNi$_x$Co$_y$Mn$_z$O$_2$, LiNi$_{0.33}$Co$_{0.33}$Mn$_{0.33}$O$_2$), lithium iron phosphate (LFP, e.g., LiFePO$_4$), and mixtures and combinations thereof.

The battery 10 includes an electrolyte 16 between anode 12 and cathode 14. Suitable electrolytes 16 may include a salt and a solvent and/or diluent. In some examples, the salt may include, but is not limited to, sodium trifluoromethanesulfonate (NaTf), lithium bis(trifluoromethylsulphonyl)imide (LiTFSI), lithium hexafluorophosphate (LiPF$_6$), lithium trifluoromethanesulfonate (LiCF$_3$SO$_3$), lithium bistrifluoromethylsulfonyl imide (Li(CF$_3$SO$_2$)$_2$N), lithium nitrate (LiNO$_3$), lithium hydroxide (LiOH), lithium iodide, lithium chloride (LiCl), lithium bromide (LiBr), lithium fluoride (LiF), lithium perchloride (LiClO$_4$), lithium tetrafluoroborate (LiBF$_4$), lithium oxalyldifluoroborate (LiODFB), lithium bis(oxalato)borate (LiBOB), and mixtures and combinations thereof. Electrolyte 16 may additionally, or alternatively, include salts of sodium similar to those listed above for lithium.

In some examples, electrolyte 16 may also include one or more diluents. For example, electrolyte 16 may additionally include 1,2-dimethoxyethane (DME), diethyl sulfite, ethylene sulfites, ethyl methyl carbonate (EMC), fluorinated carbonates (e.g., fluoroethylene carbonate (FEC)), methyl acetate (MA), dimethyl sulfoxide (DMSO), ionic liquids (ILs), ethylene carbonate (EC), propylene carbonate (PC), dimethyl carbonate (DMC), diethyl carbonate (DEC), ethyl propyl ether (EPE), tetrahydrofuran (THF), 1,3-dioxolane (DOL), dimethyldiglycol (diglyme), triethylene glycol dimethyl ether (triglyme), tetra(ethylene glycol)dimethyl ether (TEGDME), adiponitrile, sulfones (e.g., allyl methyl sulfone), ethyl sulfite, phenylcyclohexane, vinylene carbonate, dimethylacetamide (DMA), n-methyl-2-pyrrolidone (NMP), diethyldiglycol (DEDG), acetonitrile (ACN), dimethyl formamide (DMF), ethylene glycol (EG), triethyl amine (TEA), ethyl acetate, and mixtures and combinations thereof.

The optional porous separator 18 is constructed of an electrically non-conductive material, resides between anode 12 and cathode 14, and controls movement of electrons through battery 10 such that the electrons move through an external circuit to which battery 10 is connected. In various embodiments, the separator 18 is a material chosen from nonwoven fibers such as, for example, cotton, nylon, polyesters, and glass; organic polymers such as, for example, polyethylene, polypropylene, fluorinated polymers such as poly(tetrafluoroethylene), polyvinyl chloride, and polyimides; ceramics; and, natural non-conductive materials such as, for example, rubber, asbestos, and wood; and mixtures and combinations thereof. In some examples, which are not intended to be limiting, the separator 18 may include glass microfibers or an epoxy-based polymeric compound.

Figure 2:
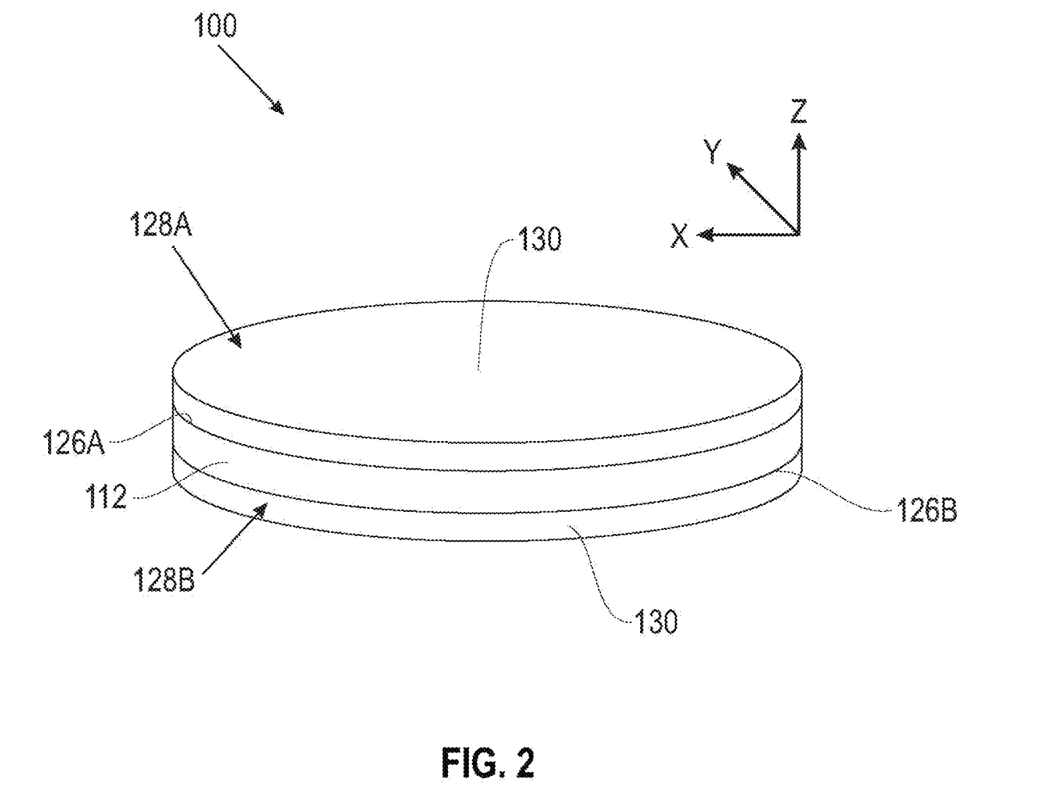
FIG. 2 is an enlarged view of an embodiment of a coated metallic anode.

Referring to FIG. 2, which is not to scale, a coated metallic anode construction 100 includes a metallic anode 112 with a first major surface 126A and a second major surface 126B. A first coating layer 128A is on the first major surface 126A, and a second coating layer 128B is on the second major surface 126B, with at least one of the coating layers 128A, 128B including at least one layer with functionalized star polymers. As noted in FIG. 2, the coating layers 128A, 128B reside directly on the major surfaces 126A, 126B of the anode 112, and contact the metallic anode material without any intervening layers.

The coatings 128A, 128B are electrically non-conductive, which in this application refers to electrically insulating materials with electrical resistivity between about $10^{12}$ and about $10^{20}$ Ohm-meter at 20° C. The coatings 128A, 128B are chemically stable with respect to the material of the metallic anode, and are electrochemically stable in the battery operation voltage window between greater than 0 V and up to about 5 V.

In some embodiments, which are not shown in FIG. 2, the metallic anode 112 may include a single coating layer 128 on only one surface thereof, with the opposed surface remaining uncoated. The coating layers 128 may be continuous or discontinuous, and may overlie all or a portion of the surfaces 126A, 126B of the anode 112.

In some embodiments, either or both of the coating layers 128A, 128B include a single layer of functionalized star polymers 130. The single layer provides an ultrathin coating on the metallic anode with a thickness of about 1 nm to about 100 nm, or about 5 nm to about 20 nm. In other embodiments, the coatings 128A, 128B can include multiple layers of functionalized star polymers. The functionalized star polymers 130 in the coatings 128A, 128B on the major surfaces 126A, 126B of the anode 112 include a core and a plurality of polymer arms on the core, wherein the core includes ionically non-conductive (ion-insulating) functional groups and the polymer arms include ionically conductive functional groups. In this application, the term ionically conductive refers to functional groups that promote metallic ion transport in an energy storage device. In some embodiments, suitable ionically conductive functional groups have a conductivity with respect to metallic ions such as, for example, Li, Na, K, and the like, of greater than about $10^{-7}$ S/cm.

In this disclosure the term "star polymer" refers to any branched polymer including a plurality of linear polymer arms (at least 3) attached at a central core. The Matyjaszewski group at Carnegie Mellon University provides general information regarding the structure and synthesis of various star copolymers at the web site identified by the concatenation of "cmu.edu" and "maty/materials/Polymers_with_specific_Architecture/star-copolymers.html."

The core, or center, of the star polymers 130 in the coating layers 128A, 128B can be an atom, molecule, or macromolecule, or a globular microgel (i.e., a cross-linked polymer gel of microscale proportions), and in some embodiments the core itself may be multifunctional. In various embodiments, the core contains aromatic, aliphatic, or mixed substituents with carbon only or mixtures containing heteroatoms. In some embodiments, the core is crosslinked and contains a plethora of surface functionality. In some embodiments, the core retains its shape by covalent crosslinking, although it could also be held together by electrostatic, hydrogen bonding, pi-stacking, or metal-ligand interactions.

In some embodiments, the core of the star polymers 130 is ionically non-conductive and includes a non-polar hydrophobic polymer. Suitable examples of ionically non-conductive and non-polar materials for the core of the star polymers include, but are not limited to, hydrocarbon polymers such as polystyrene, polyethylene, polypropylene, poly(alkylmethacrylate), and polyacrylamide. In some embodiments, the hydrocarbon polymer may optionally be crosslinked. In some embodiments, the hydrophobic core of the star polymer with a non-polar moiety such as a hydrocarbon plays an important role in maintaining mechanical integrity of the coating 128 in the organic polar solvents that are typically used in the electrolyte 16 of the battery 10 (FIGS. 1-2).

The chains, or "arms," of the star polymers 130 making up the coating layers 128A, 128B include variable-length organic chains, which can be made of similar or different monomeric units. The arms on the star polymers 130 in the coating layers 128A, 128B can be chemically identical (homostars) or different (heterostars or miktoarm stars). The arms may be composed of multiple monomers or polymers, resulting in star-block polymers or random star copolymers. In various embodiments, the star polymers include at least 3, or at least 6, or at least 10, or at least 20, or at least 30, or at least 60, arms covalently attached to the hydrophobic core.

At least some of the monomeric units making up the arms of the star polymers include ionically conductive polar functional groups, which in this application refers to polar functional groups that promote metallic-ion transport in an energy storage device. Suitable ionically conductive polar functional groups can be selected depending on the metallic anode material used in the energy storage device such as, for example, Li, Na, K and the like. For example, polyethylene glycol (PEG), a Li-ion conductor, can be present in the arms. In other examples, suitable ionically conductive polar functional groups include, but are not limited to, sulfonates, phosphonate, borate, and mixtures and combinations thereof. In some embodiments, suitable ionically conductive polar functional groups include sulfonated polymers such as sulfonated polystyrene, sulfonated tetrafluoroethylene, and linear sulfonated polymers such as those available from Perma Pure, Lakewood, NJ, under the trade designation NAFION. In some embodiments, to enhance ion conductivity, the sulfonated functional groups should include metal ions instead of being in an acidic form. For example, for use in a lithium ion battery, a lithiated form of a sulfonated polymer can be used.

In various embodiments, the polar ionically conductive arms of the star polymers 130 include a (meth)acryl backbone, wherein (meth)acryl includes acrylates and methacrylates. In some example embodiments, the (meth)acryl backbone is functionalized with ion conductive polar functional groups including, but not limited to, polyethylene glycol (PEG), amines, and sulfonated moieties. Suitable (meth) acryl groups for the star polymer arms include, but are not limited to, polyethylene glycol (PEG) (meth)acrylates such as polyethylene glycol methacrylate (PEGMA), (meth)acrylamides, amino (meth)acrylates such as dimethylaminoethyl methacrylate (DMAEMA), (meth)acrylic acids such as polymethacrylic acid (PMAA), precursors of the foregoing compounds, and mixtures combinations thereof.

In various embodiments, additional positively-charged moieties for the arms of star polymers 130 include, but are not limited to, ammonium, phosphonium and sulfonium cations, as well as functional groups reasonably anticipated to become cationic in aqueous or acidic solution such as, for example, amines.

Non-limiting examples of additional useful negatively-charged moieties for the arms of star polymers 130 include carboxylates, sulfonates, sulfinates, sulfonamides, phosphates, phosphinates, phosphonates, hydroxyamic acids, and imides.

In some embodiments, the polar arms may include zwitterionic moieties.

Non-limiting examples of other useful moieties for the arms of star polymers 130 include, but are not limited to, hydrogen donors including alcohols or weak acids (COOH) with hydrogen acceptors containing ketones (for example, poly(N-vinylpyrrolidone)), amide (for example, poly(N-isopropylacrylamide) or hydroxyalkylamide), esters (for example, hydroxyalkylesters), ureas, thioureas, guanidines and alkylene oxide (for example, polyethylene oxide) moieties.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

Referring again to FIGS. 1-2, in some embodiments the cores of the star polymers 130 are selected to include hydrophobic materials so that the star polymers "self-assemble" on the hydrophobic major surfaces 126A, 126B of the anode 114 to form the star polymer coating layers 128A, 128B. In various embodiments, the self-assembled coatings 128 can be a single layer of star polymers, which is referred to herein as a monolayer of star polymers, or can include multiple layers of star polymers. In this application the term "self-assemble" means the star polymers align with one another in an organized structure or pattern of building blocks. The interactions between the hydrophobic cores of the star polymers, which can be, for example, the result of any of Van der Waals attraction, electrostatic charge interaction or electronic (e.g., charge transfer) interaction or hydrogen bonding or metal-ligand interaction, cause the star polymers to align with one another on the surfaces 126A, 126B to form the star polymer coatings 128A, 128B. In some embodiments, the star polymers lie down adjacent to one another without external direction to form monolayer coatings 128A, 128B on the surfaces 126A, 126B of the metallic anode 114.

While not wishing to be bound by any theory, presently available evidence indicates that the multiplicity of polar arms on the star polymers modify the surface wetting behavior of the surfaces 126A, 126B and make the surfaces miscible with an organic electrolyte solvent. The coating 128 effectively modifies the wettability of the surfaces 126A, 126B of the metallic anode 114, and the nanodomains formed by ion-insulating core of star polymer can effectively suppress or even prevent dendrite formation on the surfaces 126A, 126B. The ultrahigh critical micelle concentration of the star polymers not only provides an ultrathin coating on the metallic electrode surface due to its unique self-assembly behavior, but also creates a significantly larger number of ion diffusion pathways, originated from ionically conductive functional groups in the arms of star polymers, via efficient surface modification enabling controlled distribution of the nucleation sites, and mitigates the irregular deposition of the metal ions from the electrolyte media when incorporated in metal based rechargeable batteries.

Figure 10:
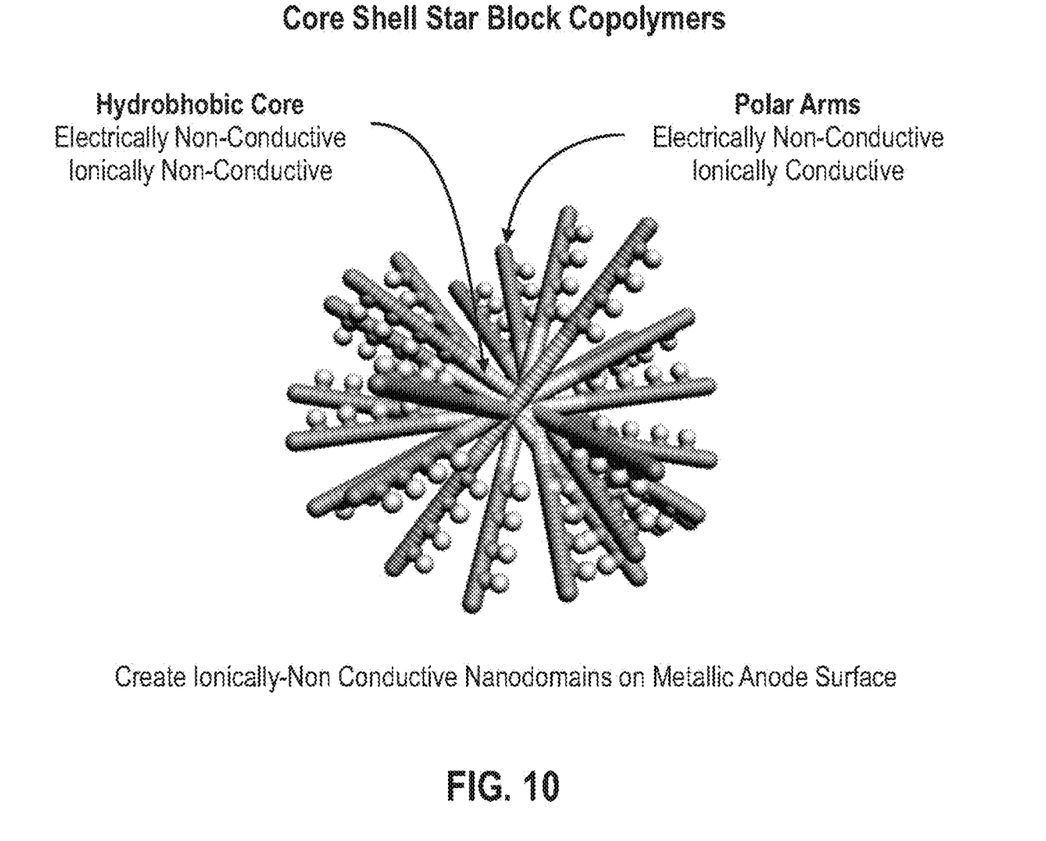
FIG. 10 is a schematic perspective view of a star polymer.
Figure 11A:
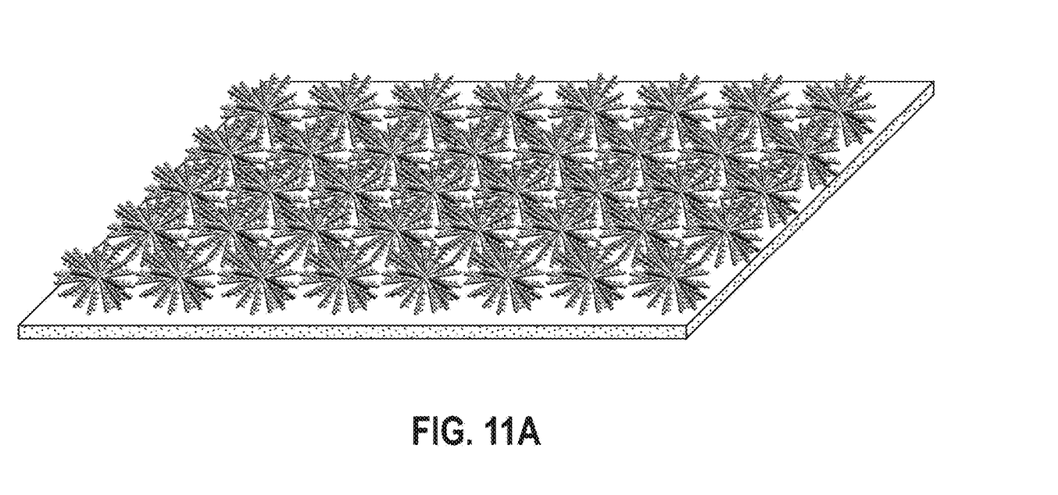
FIG. 11A is a schematic overhead perspective view of a star polymer coated metal electrode.
Figure 11B:
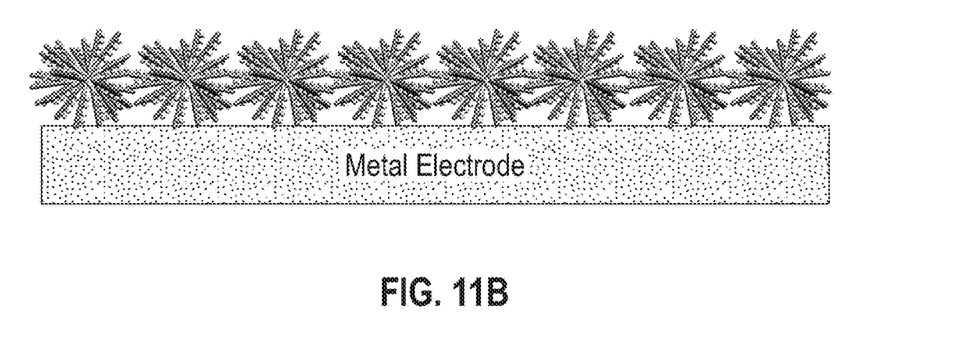
FIG. 11B is a schematic cross-sectional view of a star polymer coated metal electrode.

The hydrophobic cores of the star polymers form nano-scale hard domains, which are ionically non-conductive, within an ionically conductive shell-like soft matrix formed by the arms of the star polymers. The hard domain cores of the star polymers are relatively immiscible with the electrolyte solvent utilized in the energy storage device, which can improve the mechanical durability of the coating. The ionically insulating nature of the nano-scale hard domains formed by the cores of the star polymers can also suppress micron-scale dendrite penetration. A schematic diagram of an embodiment of a star polymer is shown in FIG. 10, and schematic representations of a star polymer coated metal electrode are shown in FIG. 11A and FIG. 11B.

In another aspect, the present disclosure is directed to a process of modifying a surface of a metallic anode in an energy storage device such as a battery. In this process the surfaces of the anode are altered by applying on the anode a star polymer having an ion-insulating hydrophobic core and ionically conductive polar functional moieties on the exposed arms. In one embodiment, the process includes exposing a metallic anode for an energy storage device, such as a battery, to a solution including a star polymer with an ion-insulating hydrophobic core and ionically conductive polar functional arms for a time sufficient to form a monolayer of star polymers on the surface of the metallic anode. A star polymer coated electrode in an energy storage device, such as a rechargeable battery, has reduced dendrite growth, which can improve electrochemical performance of the battery compared to a battery with uncoated metal electrodes.

In various embodiments, the star polymer solution can include any solvent that is compatible with metallic anode materials. In some embodiments, the solvent in the star polymer solution is an ethereal solvent, or may be dimethoxyethane (DME). In various embodiments, the star polymer is present in the star polymer solution at a concentration of about 0.01 wt % to about 10 wt %, about 0.1 wt % to about 5 wt %, about 0.1 wt % to about 1 wt %, or about 0.1 wt % to about 0.5 wt %.

In various embodiments, a major surface of the metallic anode is exposed to the organic solution of the star polymer for about 1 minute to about 5 hours. Following exposure to the organic star polymer solution, the treated anode may optionally be drained to remove excess star polymer solution.

In some embodiments, the coated anode may optionally be dried by heating in an oven or by exposure to ambient or heated air, or may be vacuum-dried, or a combination thereof.

In various embodiments, the coated metallic anode may optionally be rinsed with a solvent prior to or after the draining step, and suitable solvents include dimethoxyethane (DME), particularly anhydrous DME.

The resulting metallic anode with the star polymer coating may then be incorporated into any suitable energy storage device such as a battery.

The present disclosure will now be described with respect to the following non-limiting examples.

EXAMPLES

Example 1

Preparation of the Star Polymer Protected Electrode and Cell Assembly

A solution of 1 wt. % amphiphilic star polymer functionalized with additional random block copolymers including four different compositions of poly(dimethylaminoethyl methacrylate) (PDMAE-MA) and poly(ethylene glycol) methacrylate (PEG-MA) (ratios of 100 to 0, 50 to 50, 25 to 75, and 0 to 100) dissolved in an organic solvent (1,2-dimethoxyethane (DME)) was prepared in a 20-mL borosilicate glass scintillation vial. A lithium metal foil disc chosen as an example of a metal electrode suitable for use in an energy storage device such as a battery was placed onto a stainless-steel electrode tip of a Swagelok-type cell and immersed in the prepared solution for 15 minutes while lightly stirring the solution with a magnetic stir bar.

The electrode tip with the lithium disc was then removed from the solution and gently cleaned three times, 30 seconds each time, with three different fresh wash liquids of anhydrous DME prepared in three different vials. The lithium metal disc was then found to be coated with a self-assembled star polymer coating. A separator wetted by a liquid electrolyte solution was then placed on top or in between the star polymer coated metal electrodes. All cell assembly was done in an argon filled glovebox with less than 0.1 ppm $H_2O$ and $O_2$.

Figure 3A:
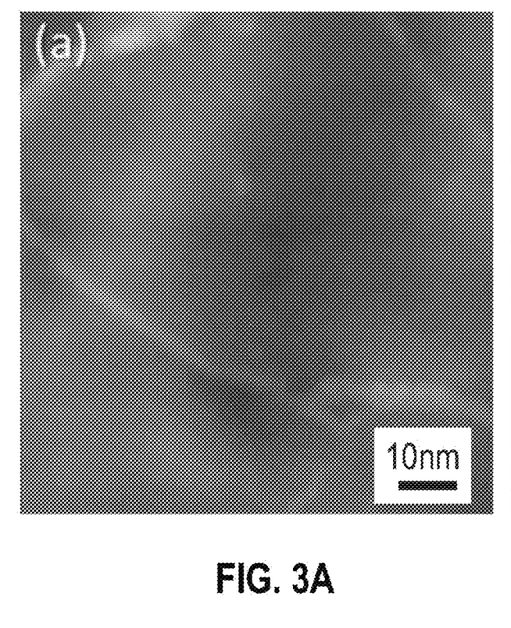
FIG. 3A is an Atomic Force Microscope (AFM) image of the lithium metal surface without the star polymer coating of Example 1. The scale bar in FIG. 3A is equivalent to about 50 nm.
Figure 3B:
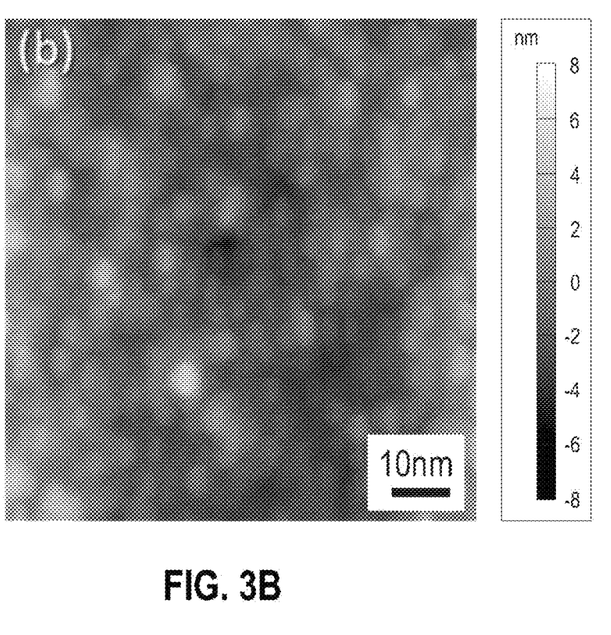
FIG. 3B is an Atomic Force Microscope (AFM) image of the lithium metal surface with the star polymer coating of Example 1. The scale bar in FIG. 3A is equivalent to about 50 nm.

FIGS. 3A-3B show atomic force microscope (AFM) images of the star polymer coated Li metal electrodes with low and high magnification, respectively. The images show that star polymers with a size of approximately 20 nm each in diameter attracted one another and self-assembled on the surface of the electrode to form an ultrathin monolayer.

Example 2

Star Polymer Protected Lithium Metal Electrodes with Ether Based Electrolyte

Figure 4A:
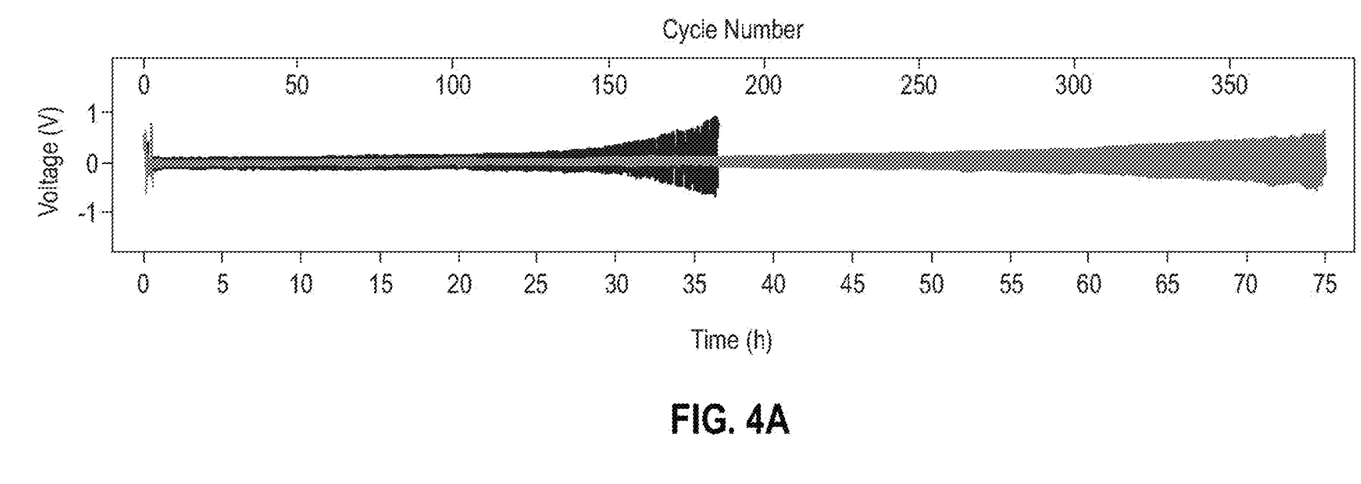
FIG. 4A is a plot from Example 2 comparing the cycling behavior of a Li|Li symmetric cell cycled at a current density of 10.0 mA/cm$^2$ with 1 M LiTFSI-DME electrolyte, when the cell was operated with uncoated lithium metal electrodes and the coated lithium metal electrodes of Example 1.

The cells with the self-assembled amphiphilic star polymer coated metal electrodes displayed improved cycling performance, both in terms of charge transfer kinetics and rechargeability when used with an ether-based electrolyte, 1 M lithium bis(trifluoromethanesulfonyl)imide (LiTFSI) in DME electrolyte solution (FIG. 4A). The cycling behavior of the Li|Li symmetric cells plotted in FIG. 4A, using the self-assembled star polymer coated lithium metal foils at a current density of 10.0 mA/cm$^2$, showed significant improvement in compared to those using uncoated pristine lithium foils, doubling the cycle life of the cell without an exponential increase of the cell overpotential.

Figure 5:
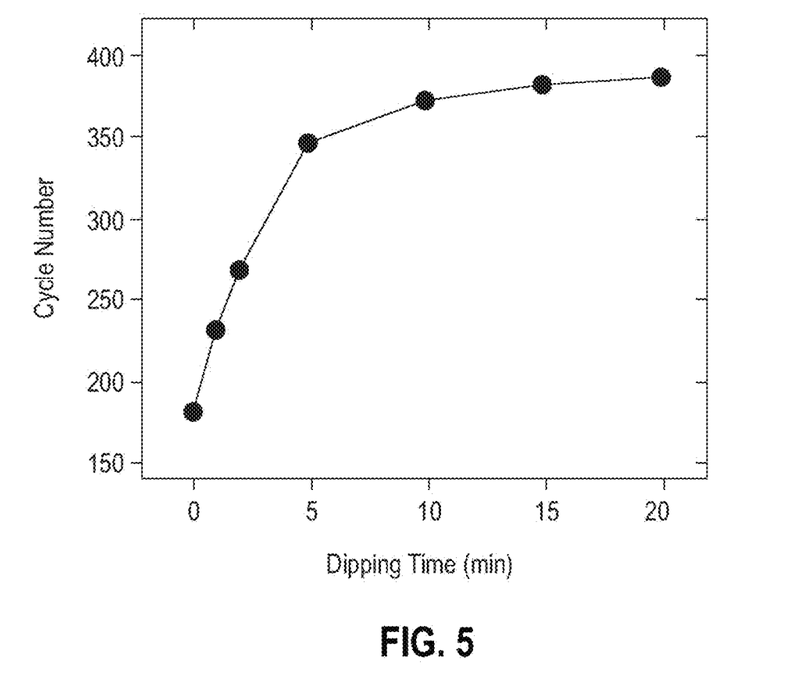
FIG. 5 is a plot showing the correlation between dipping time for metal electrodes in a star polymer solution of Example 1 and the cycle number of the cells containing the corresponding star polymer coated metal electrodes at a current density of 10.0 mA/cm$^2$ with the 1 M LiTFSI-DME electrolyte utilized in Example 2.
Figure 6A:
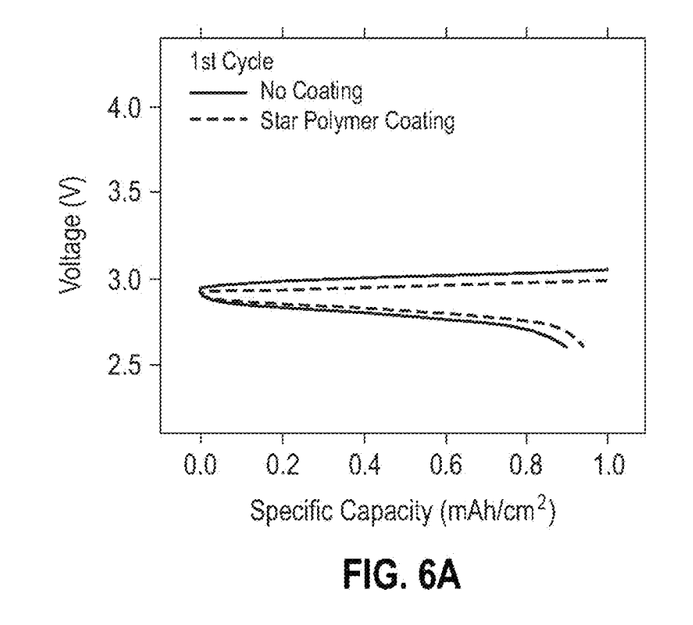
FIGS. 6A-6D are plots comparing the galvanostatic cycling behavior of uncoated pristine lithium metal electrodes and the self-assembled star polymer coated lithium metal electrodes of Example 1 in the cell of Example 4 using a 1 M lithium iodide (LiI) in methoxypropionitrile (MPN) electrolyte, cycled at a current density of 5.0 mA/cm$^2$.
Figure 6B:
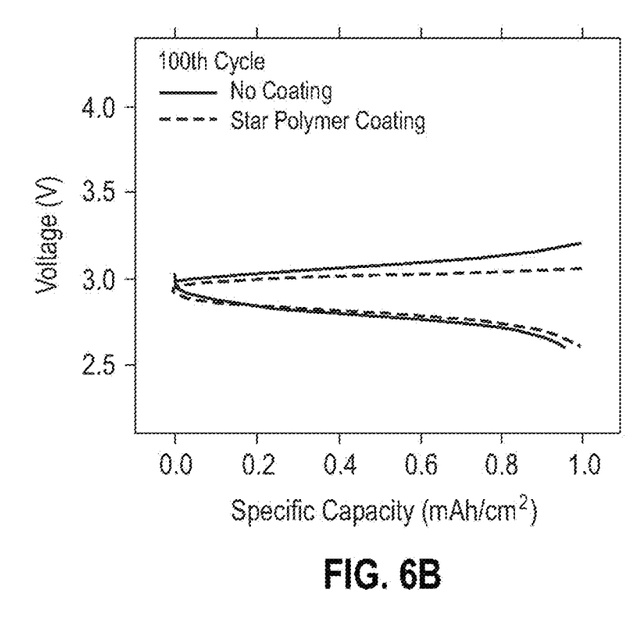
Figure 6C:
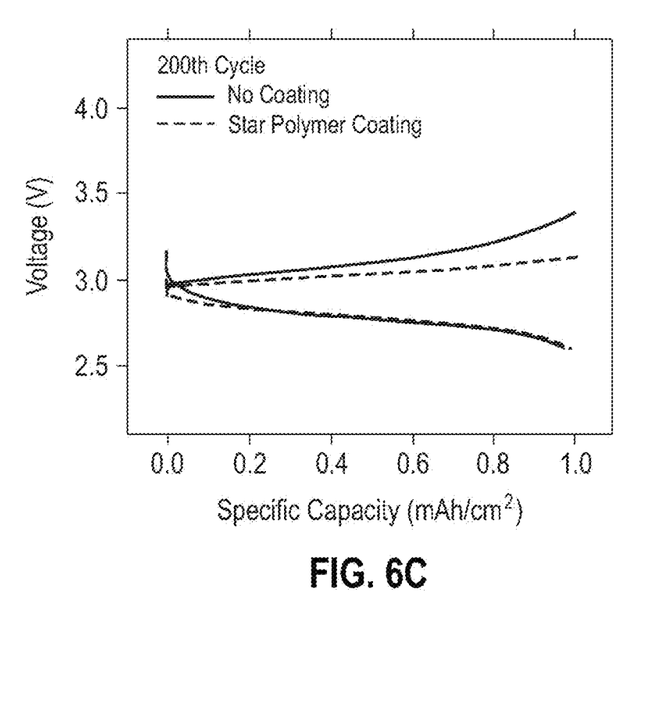
Figure 6D:
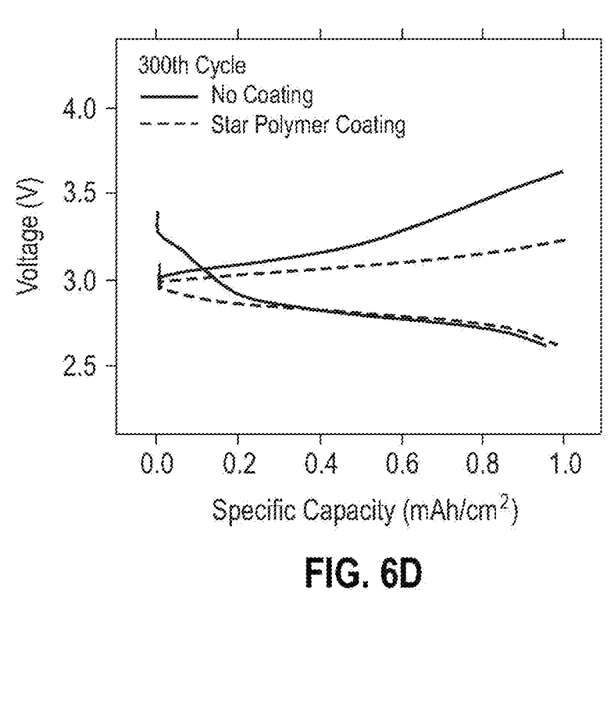

The simple and rapid coating process employed in Example 1 is a significant advantage when used to form a coating on a metal electrode. As shown in FIG. 5, the cycle life of the cell incorporating the self-assembled star polymer coating layer and using the ether-based electrolyte of this example reached a maximum when the metal electrode was dipped into the star polymer solution for 20 minutes. The cycle life of the battery using the star polymer coated metal electrodes increased dramatically from 2 minutes of dipping time to 5 minutes, which indicated that formation of the conformal self-assembled star polymer layer takes place and accelerates within the first 5 minutes of dipping time.

Example 3

Star Polymer Protected Lithium Metal Electrode with Carbonate Based Electrolyte

Figure 4B:
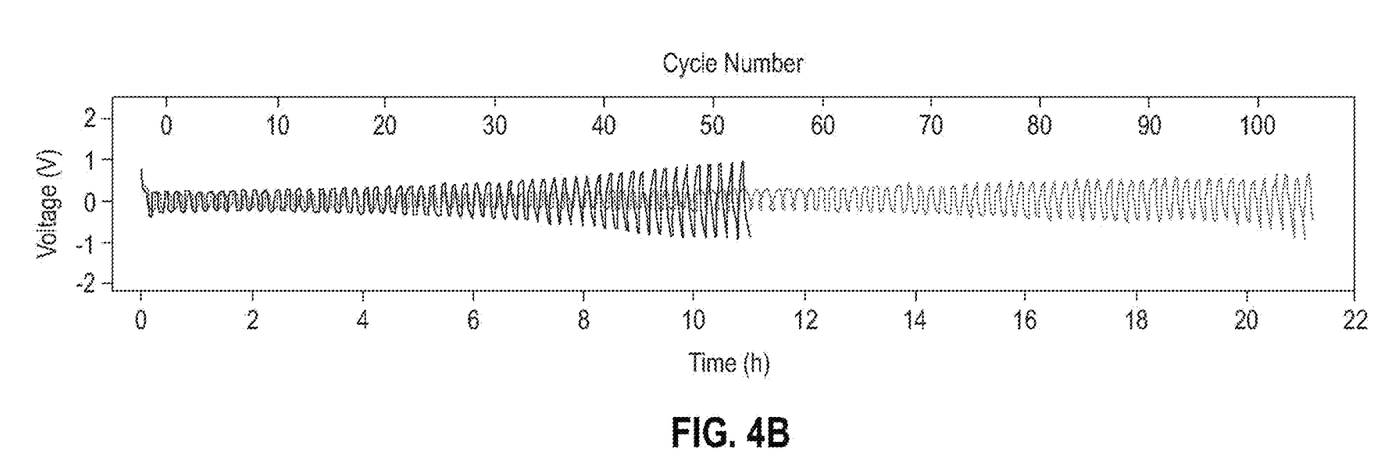
FIG. 4B is a plot from Example 3 comparing the cycling behavior of a Li|Li symmetric cell cycled at a current density of 10.0 mA/cm$^2$ with 1 M LiPF$_6$-EC-DMC electrolyte, when the cell was operated with uncoated lithium metal electrodes and the coated lithium metal electrodes of Example 1.

The cells with the self-assembled amphiphilic star polymer coated metal electrodes displayed improved cycling performance, both in terms of charge transfer kinetics and rechargeability, when used with a carbonate-based electrolyte, a 1 M lithium hexafluorophosphate (LiPF$_6$) in a 1:1 (v/v) mixture of ethylene carbonate (EC) and dimethyl carbonate (DMC) electrolyte solution (FIG. 4B). The cycling behavior of the Li|Li symmetric cells plotted in FIG. 4B, using the self-assembled amphiphilic star polymer coated lithium metal foils at a current density of 10.0 mA/cm$^2$, showed significant improvement compared to those using uncoated pristine lithium foils, doubling the cycle life of the cell without an exponential increase of the cell overpotential.

Example 4

Star Polymer Protected Lithium Metal Electrode with Nitrile-Based Electrolyte

The cells with the self-assembled amphiphilic star polymer coated metal electrodes of Example 1 displayed improved cycling performance, both in terms of charge transfer kinetics and rechargeability, in a cell with a nitrile-based electrolyte, 1 M lithium iodide (LiI) in methoxypropionitrile (MPN) (FIGS. 6A-6D and 7). The cycling behavior of the Li|Li symmetric cells plotted in FIGS. 6A-6D, using the self-assembled amphiphilic star polymer coated lithium metal foils at a current density of 5.0 mA/cm$^2$, showed significant improvement in comparison with the cells using uncoated pristine lithium foils, doubling the cycle life of the cell without an exponential increase of the cell overpotential.

Figure 7:
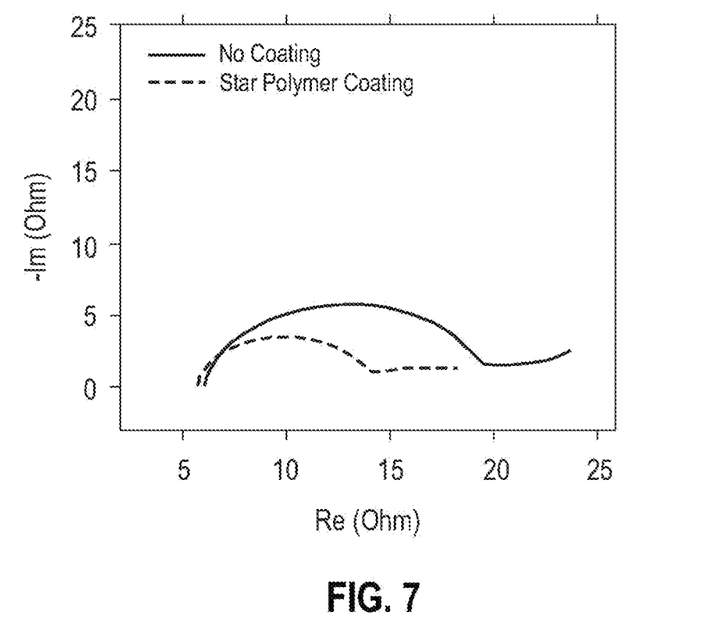
FIG. 7 is a Nyquist plot of electrochemical impedance spectroscopy (EIS) spectra of the Li|Li symmetric cells of Example 4, wherein the Li electrodes in the cells were tested with and without the star polymer coating.

A Nyquist plot from the EIS spectra of the cells of this example are shown in FIG. 7. The plot of FIG. 7 indicated, based on the estimation of the width of the semicircles in each case, that the cells using electrodes with the star polymer coating provided enhanced charge transfer kinetics.

Example 5

Figure 8A:
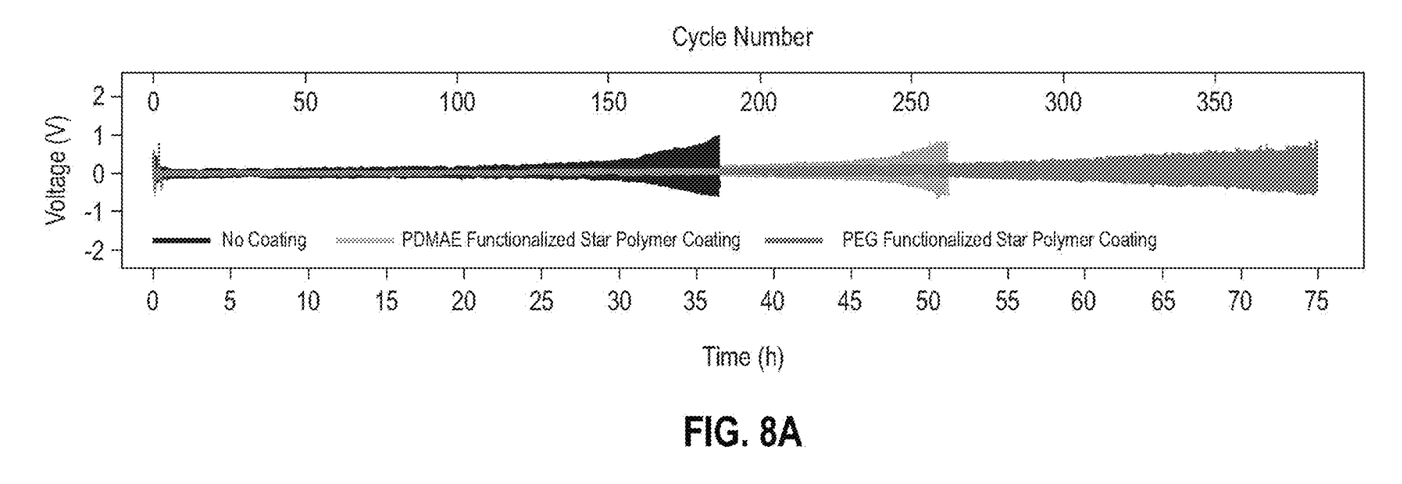
FIG. 8A is a plot from Example 5 comparing the cycling behavior of a Li|Li symmetric cell cycled at a current density of 10.0 mA/cm$^2$ with 1 M LiTFSI-DME electrolyte, when the cell was operated with: uncoated lithium metal electrodes; lithium metal electrodes of Example 1 coated with star polymers functionalized with 100% PDMAE (amine functional groups), or lithium metal electrodes of Example 1 coated with 100% PEG functionalized star polymers.

Functionalized Star Polymer Protected Lithium Metal Electrodes with Ether-Based Electrolyte The cells with the star polymer coated electrodes of Example 1 demonstrated improved cycling performance in a cell operated with an ether-based 1 M lithium bis(trifluoromethane-sulfonyl)imide (LiTFSI) in DME electrolyte solution (FIG. 8A).

The cycle life of the cell using lithium metal electrodes coated with 100% PDMAE functionalized star polymers showed more improvement than the cell using lithium metal electrodes coated with 100% PEG functionalized star polymers, which indicated that the ether-based electrolyte was more compatible with amine functionalized star polymer coatings.

Figure 9:
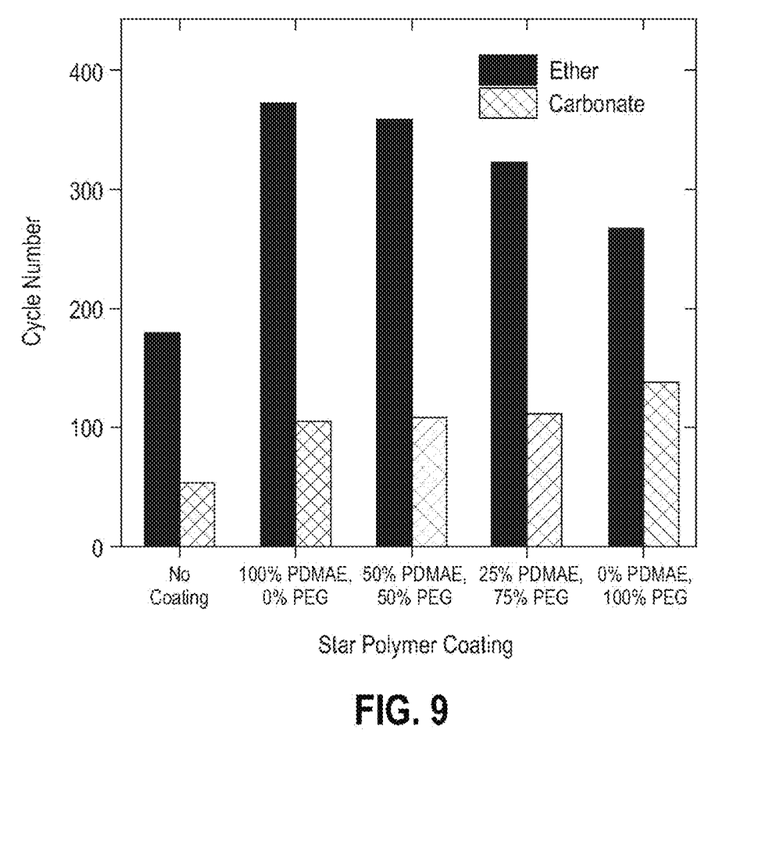
FIG. 9 is a plot showing the cycle number of Li|Li symmetric cells at a current density of 10.0 mA/cm$^2$ with respect to the type of star polymer used to coat the surface of lithium metal electrodes and the type of electrolyte used in the cell.

However, regardless which type of functionalized star polymer is used for a lithium metal protective coating, cell rechargeability is improved, as presented in the plot of FIG. 9. All cycling profiles in FIG. 9 were obtained while running at a current density of 10.0 mA/cm$^2$. The compatibility of the star polymer functionalization and the electrolyte formulation can further enhance the electrochemical performance of rechargeable batteries.

Example 6

Figure 8B:
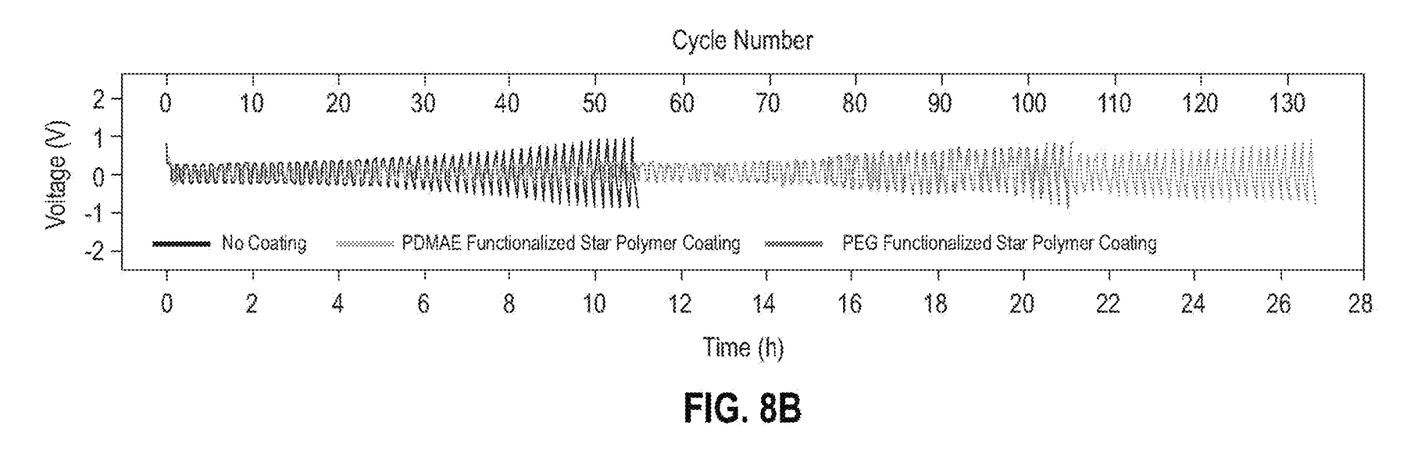
FIG. 8B is a plot from Example 6 comparing the cycling behavior of a Li|Li symmetric cell cycled at a current density of 10.0 mA/cm$^2$ with 1 M LiPF$_6$-EC-DMC electrolyte, when the cell was operated with: uncoated lithium metal electrodes; lithium metal electrodes of Example 1 coated with star polymers functionalized with 100% PDMAE (amine functional groups), or lithium metal electrodes of Example 1 coated with 100% PEG functionalized star polymers.

Functionalized Star Polymer Protected Lithium Metal Electrode with Carbonate-Based Electrolyte The cells with the star polymer coating on the metal electrodes functionalized with the four different compositions of Example 1 demonstrated improved cycling performance when operated with a carbonate-based electrolyte having 1 M lithium hexafluorophosphate (LiPF6) in a 1:1 (v/v) mixture of ethylene carbonate (EC) and dimethyl carbonate (DMC) electrolyte solution (FIG. 8B).

The cycle life of the lithium symmetric cell using lithium metal electrodes coated with 100% PEG functionalized star polymer showed more improvement than the cell using electrodes coated with 100% PDMAE functionalized star polymer. These results indicate that the carbonate-based electrolyte is more compatible with electrodes coated with PEG functionalized star polymers.

However, regardless which type of functionalized star polymer is used for a lithium metal protective coating, cell rechargeability is improved, as presented in the plot of FIG. 9. All cycling profiles in FIG. 9 were obtained while running at a current density of 10.0 mA/cm$^2$. The compatibility of the star polymer functionalization and the electrolyte formulation can further enhance the electrochemical performance of rechargeable batteries.

Various examples have been described. These and other examples are within the scope of the following claims.

What is claimed is:

1. An energy storage device, comprising:
   a coated anode comprising a metallic anode that includes at least one surface in contact with an electrically non-conductive star polymer coating including a nanoscale pattern on the at least one surface of the metallic anode, wherein the star polymers in the star polymer coating comprise a hydrophobic core with at least 3 arms attached to the core, and wherein the core comprises an ionically non-conductive core, and at least some of the arms of the star polymers comprise ionically conductive polar functional groups, wherein the hydrophobic core is disposed on at least one surface of the metallic anode, and the star polymer coating comprises ionically non-conductive nanodomains formed from the cores of star polymers within an ionically-conductive matrix formed from the arms of star polymers;
   a cathode; and
   an electrolyte in contact with both the cathode and the coated anode,
   wherein the star polymer coating is a single layer of star polymers, wherein the star polymer coating has a thickness between about 5 nm and about 20 nm.

2. The energy storage device of claim 1, wherein the star polymer coating is self-assembled.

3. The energy storage device of claim 1, wherein the cores of the star polymers comprise a hydrocarbon polymer selected from the group consisting of polystyrene, polyethylene, polypropylene, and mixtures and combinations thereof.

4. The energy storage device of claim 3, wherein the hydrocarbon polymer is crosslinked.

5. The energy storage device of claim 1, wherein the ionically conductive polar functional groups are selected from the group consisting of sulfonates, phosphonate, borate, and mixtures and combinations thereof.

6. The energy storage device of claim 1, wherein the arms of the star polymer comprise a (meth)acryl backbone selected from the group consisting of polyethylene glycol methacrylate (PEGMA), dimethylaminoethyl methacrylate (DMAEMA), polymethacrylic acid (PMAA), precursors of the foregoing, and combinations thereof.

7. The energy storage device of claim 1, wherein the ionically conductive arms of the star polymers comprise sulfonated polymers.

8. The energy storage device of claim 1, wherein the anode comprises a metal selected from the group consisting of lithium, sodium, magnesium, and mixtures and combinations thereof.

9. The energy storage device of claim 1, wherein the cathode comprises a material selected from the group consisting of oxygen, sulfur, metal oxides capable of metal-ion intercalation, and mixtures and combinations thereof.

10. The energy storage device of claim 1, wherein the device further comprises a porous separator between the anode and the cathode.

* * * * *